(12) United States Patent
Kuang

(10) Patent No.: US 9,401,647 B2
(45) Date of Patent: Jul. 26, 2016

(54) SWITCHING MODE POWER SUPPLY AND THE CONTROL METHOD THEREOF

(71) Applicant: Chengdu Monolithic Power Systems Co., Ltd., Chengdu (CN)

(72) Inventor: Naixing Kuang, Hangzhou (CN)

(73) Assignee: Chengdu Monolithic Power Systems Co., Lt.d, Chengdu (CN)

( * ) Notice: Subject to any disclaimer, the term of this patent is extended or adjusted under 35 U.S.C. 154(b) by 147 days.

(21) Appl. No.: 14/191,957

(22) Filed: Feb. 27, 2014

(65) Prior Publication Data

US 2015/0043252 A1   Feb. 12, 2015

(30) Foreign Application Priority Data

Aug. 9, 2013   (CN) .......................... 2013 1 0346923

(51) Int. Cl.
*H02M 3/335* (2006.01)
*H02M 1/36* (2007.01)
*H02M 1/08* (2006.01)
*H02M 1/00* (2006.01)

(52) U.S. Cl.
CPC ............ *H02M 3/33507* (2013.01); *H02M 1/36* (2013.01); *H02M 1/083* (2013.01); *H02M 2001/0058* (2013.01)

(58) Field of Classification Search
CPC ... H02M 3/33507; H02M 3/335; H02M 1/08; H02M 2001/0058; H02M 1/083

USPC ............. 363/21.12, 21.16; 323/284, 285, 319
See application file for complete search history.

(56) References Cited

U.S. PATENT DOCUMENTS

| | | | |
|---|---|---|---|
| 2010/0164579 A1* | 7/2010 | Acatrinei | H02M 1/4208 327/172 |
| 2010/0289474 A1* | 11/2010 | Kuo | H02M 3/156 323/284 |
| 2011/0194312 A1* | 8/2011 | Gaknoki | H02M 1/083 363/21.12 |
| 2011/0228570 A1 | 9/2011 | Li | |
| 2012/0224397 A1* | 9/2012 | Yeh | H02M 3/33507 363/21.12 |
| 2014/0159608 A1* | 6/2014 | Simi | H05B 33/0815 315/205 |

* cited by examiner

*Primary Examiner* — Gary L Laxton
*Assistant Examiner* — Kyle J Moody
(74) *Attorney, Agent, or Firm* — Perkins Coie LLP

(57) ABSTRACT

A switching mode power supply, having: a power switch; an energy storage component coupled to the power switch; a current sense resistor configured to generate a current sense signal; a mode select resistor configured to generate a mode select resistor; a ZCD (Zero Cross Detecting) circuit configured to generate a ZCD signal; and a control circuit configured to provide a switch control signal to control the on and off of the power switch, the control circuit having a multifunction pin configured to receive the mode select signal, the current sense signal and the ZCD signal.

20 Claims, 12 Drawing Sheets

US 9,401,647 B2

SWITCHING MODE POWER SUPPLY AND THE CONTROL METHOD THEREOF

CROSS-REFERENCE TO RELATED APPLICATION(S)

This application claims priority to and the benefit of Chinese Patent Application No. 201310346923.8, filed Aug. 9, 2013, which is incorporated herein by reference in its entirety,

TECHNICAL FIELD

The present invention relates generally to electrical circuits, and more particularly but not exclusively to switching mode power supply and the control method thereof.

BACKGROUND

Switching mode power supplies are normally used to provide desired DC power to electronic devices, like LED (light-emitting diode) strings and so on.

The switching mode power supply usually comprises an energy storage component, e.g. an inductor or a transformer, and a power switch coupled to the energy storage component. There are two primary types of control methods used in the switching regulator. One is fixed frequency control and the other one is variable frequency control. An example of variable frequency control is Quasi-Resonant (QR) control. FIG. 1 shows the waveforms of signals in a Quasi-Resonant Controlled switching mode power supply comprising a power switch and a transformer. In FIG. 1, VDC represents a voltage across the power switch, SW represents a control signal of the power switch, and Is represents a current flowing through the transformer. In the example of FIG. 1, the switching mode power supply works under boundary current mode (BCM). As can be seen from FIG. 1, the transformer and the parasitic capacitor of the power switch resonate after the current Is flowing through the transformer decreases to zero. The power switch is turned on when the voltage VDC across the power switch decreases to zero during resonance, so as to reduce the power loss. Thus, zero cross detecting (ZCD) is needed. The power switch is turned off to regulate the output voltage/output current/output power when the current Is flowing through the transformer reaches a reference signal relating to the output voltage/output current/output power.

Normally, the control circuit of the switching mode power supply is integrated in a chip. The control circuit receives a current sense signal indicative of the current flowing through the power switch via a pin coupled to an off-chip current sense resistor, and receives a ZCD signal via another pin coupled to the off-chip power switch.

In some applications, the switching mode power supply may have several work modes. As a result, an additional pin of the control circuit for work mode selecting is needed.

In the prior art, three pins respectively for sensing the current flowing through the power switch, for detecting the voltage across the power switch to get the ZCD signal, and for selecting work mode are configured to the chip of control circuit. Obviously, too many pins increase the size and cost of the chip.

SUMMARY

It is an object of the present invention to provide a control circuit for switching mode power supply with less pins.

In accomplishing the above and other objects, there has been provided, in accordance with an embodiment of the present invention, a switching mode power supply comprising: a power switch; an energy storage component coupled to the power switch, the energy storage component storing energy when the power switch is on and transferring energy when the power switch is off; a current sense resistor coupled between the power switch and a ground reference to generate a current sense signal based on a current flowing through the power switch; a mode select resistor having a first terminal and a second terminal, the first terminal coupled to a connection node of the current sense resistor and the power switch; a ZOO (zero cross detecting) circuit configured to generate a ZCD signal based on a voltage across the power switch; a first diode having an anode terminal and a cathode terminal, the anode terminal coupled to the ZCD circuit to receive the ZCD signal; and a control circuit configured to provide a switch control signal to control the on and off of the power switch, the control circuit having a multi-function pin coupled to the second terminal of the mode select resistor and the cathode terminal of the first diode; wherein: in the startup period of the switching mode power supply, the control circuit compares the mode select signal with a mode control reference signal, and determines the work mode of the switching mode power supply based on the comparison result; in the normal operation period of the switching mode power supply, the control circuit compares the signal received by the multi-function pin with a peak current signal when the power switch is on, and compares the signal received by the multi-function pin with a ZCD reference signal when the power switch is off, and controlling the on and off of the power switch based on the comparison results.

Furthermore, there has been provided, in accordance with an embodiment of the present disclosure, a control method for a switching mode power supply, wherein the switching mode power supply comprises a power switch, an energy storage component and a control circuit, the control method comprising: generating a mode select signal in the startup period of the switching mode power supply; generating a current sense signal based on a current flowing through the power switch; generating a ZCD (Zero Cross Detecting) signal based on a voltage across the power switch; receiving the mode select signal, the current sense signal and the ZCD signal via a multi-function pin; selecting work mode of the switching mode power supply based on the mode select signal in the startup period of the switching mode power supply; if the power switch is on, comparing the signal received by the multi-function pin with a peak current signal, otherwise, comparing the signal received by the multi-function pin with a ZCD reference signal; and turning off the power switch when the current sense signal reaches the peak current signal and turning on the power switch when the ZCD signal reaches the ZCD reference signal.

In addition, there has been provided, in accordance with an embodiment of the present disclosure, a switching mode power supply, comprising: a power switch; an energy storage component coupled to the power switch, the energy storage component storing energy when the power switch is on and transferring energy when the power switch is off; a mode select circuit configured to provide a mode select signal; a ZCD (Zero Cross Detecting) circuit configured to generate a ZCD signal based on a voltage across the power switch; a first diode having an anode terminal and a cathode terminal, the anode terminal coupled to the ZOO circuit to receive the ZCD signal; and a control circuit configured to provide a switch control signal to control the on and off of the power switch, the control circuit having a multi-function pin coupled to the cathode terminal of the first diode and coupled to the mode select circuit to receive the mode select signal; wherein: in the startup period of the switching mode power supply, the control circuit compares the mode select signal with a mode control reference signal and determines the work mode of the switching mode power supply based on the comparison result; in the normal operation period of the switching mode power supply, the control circuit compares the signal received by the multi-function pin with a ZOO reference signal, and turns on the power switch based on the comparison result.

In addition, there has been provided, in accordance with an embodiment of the present invention, a switching mode power supply, comprising: a power switch; an energy storage component coupled to the power switch, the energy storage component storing energy when the power switch is on and transferring energy when the power switch is off; a current sense resistor coupled between the power switch and the ground reference to generate a current sense signal based on a current flowing through the power switch; a mode select resistor having a first terminal and a second terminal, the first terminal coupled to a connection node of the current sense resistor and the power switch; and a control circuit configured to provide a switch control signal to control the on and off of the power switch, the control circuit having a multi-function pin coupled to the second terminal of the mode select resistor; wherein: in the startup period of the switching mode power supply the control circuit, the control circuit compares the mode select signal with a mode control reference signal and determines the work mode of the switching mode power supply based on the comparison result; in the normal operation period of the switching mode power supply, the control circuit compares the signal received by the multi-function pin with a peak current signal and turns off the power switch based on the comparison result.

The use of the same reference label in different drawings indicates the same or like components.

DETAILED DESCRIPTION

Figure 1:
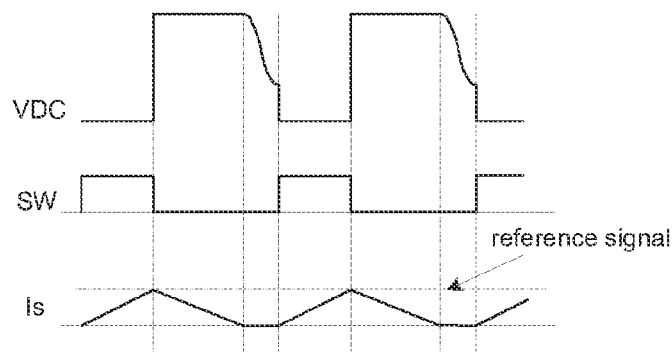
FIG. 1 shows the waveforms of signals in a prior Quasi-Resonant Controlled switching mode power supply comprising a power switch and a transformer.
Figure 2:
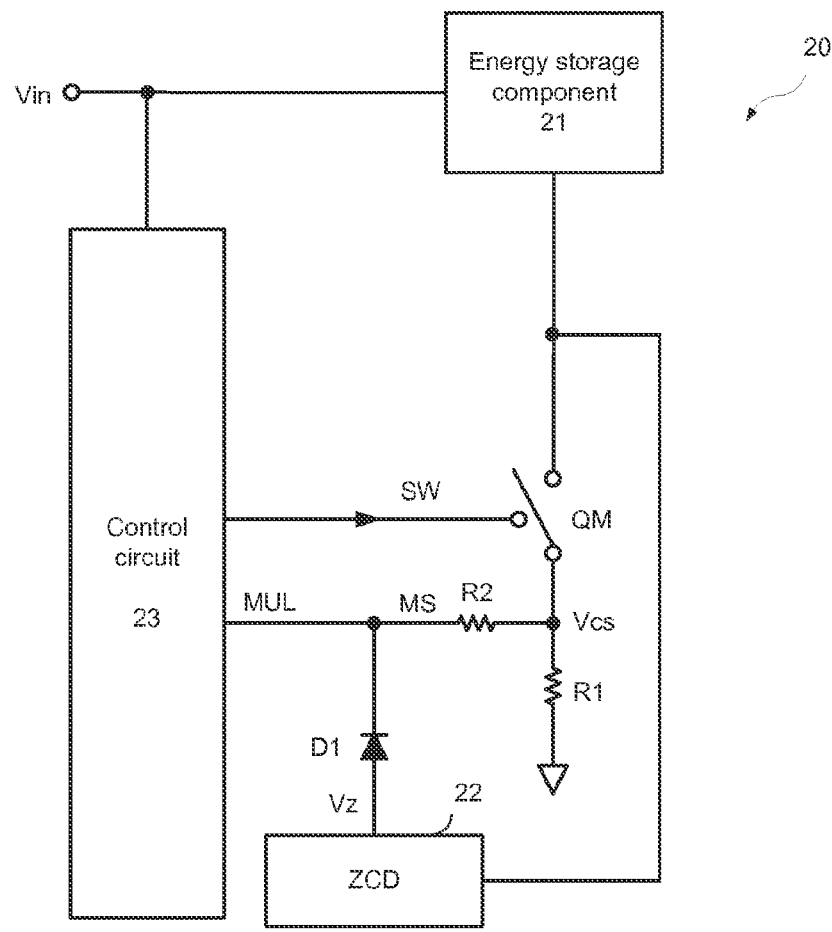
FIG. 2 shows a block diagram of a switching mode power supply 20 in accordance with an embodiment of the present invention.

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention, FIG. 2 shows a block diagram of a switching mode power supply 20 in accordance with an embodiment of the present invention. The switching mode power supply 20 comprises: a power switch QM; an energy storage component 21 coupled to the power switch QM, wherein the energy storage component 21 stores energy when the power switch QM is on and transfers energy when the power switch QM is off; a current sense resistor R1 coupled between the power switch QM and a ground reference to provide a current sense signal Vcs based on a current flowing through the power switch QM; a mode select resistor R2 having a first terminal and a second terminal, wherein the first terminal is coupled to the connection node of the current sense resistor R1 and the power switch QM; a zero cross detecting (ZCD) circuit 22 configured to provide a ZCD signal Vz based on the voltage across the power switch QM; a first diode D1 having an anode terminal and a cathode terminal, wherein the anode terminal is coupled to the ZCD circuit 22 to receive the ZCD signal Vz; and a control circuit 23 coupled to the power switch QM, wherein the control circuit 23 has a multi-function pin MUL coupled to the second terminal of the mode select resistor R2 and the cathode terminal of the first diode D1.

The switching mode power supply 20 works in the normal operation period after startup period. In one embodiment, the signal received by the multi-function pin MUL represents a mode select signal MS in the startup period. The switching mode power supply 20 may have several work modes, e.g., Discontinuous Current Mode (DCM), Boundary Current Mode (BCM) and so on, in the normal operation period. The control circuit 23 selects work mode based on the mode select signal MS. The ZCD circuit 22 is coupled to the power switch QM to detect the voltage across the power switch QM, and to provide the ZCD signal Vz based thereupon. In the normal operation period of the switching mode power supply 20, the voltage across the power switch QM is small, e.g., 0.3 Volts when the power switch QM is on. And during this time, the signal received by the multi-function pin MUL represents the current sense signal Vcs which is produced based on a current flowing from the power switch to the current sense resistor R1. In the normal operation period of the switching mode power supply 20, there is no current flowing through the power switch QM when the power switch QM is off. The signal received by the multi-function pin MUL now represents the ZCD signal Vz which indicates the voltage across the power switch QM.

The following embodiments are explained using a Flyback converter applied in an AC/DC switching mode power supply or a DC/DC switching mode power supply as an example.

However, it is obvious to persons of ordinary skill in the art that the present invention may also be adopted in other topologies, such as Buck converter, Boost converter, Buck-Boost converter, Forward converter and so on.

Figure 3:
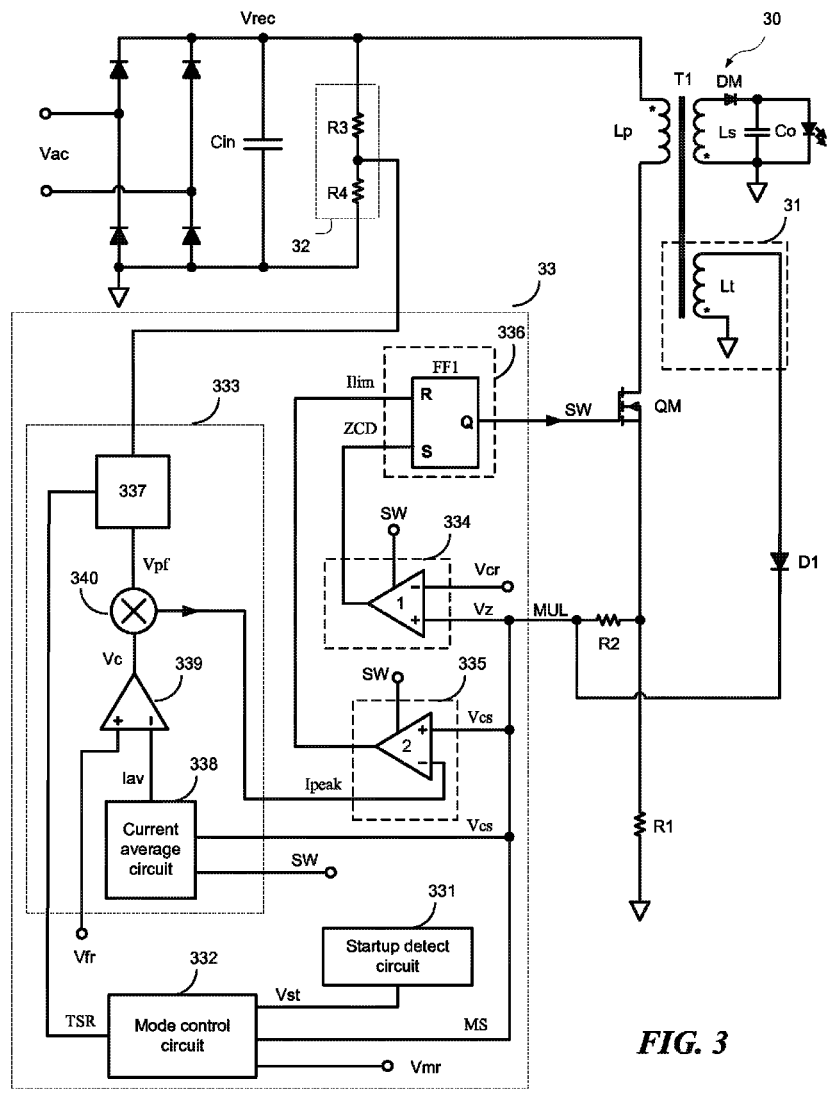
FIG. 3 schematically shows a switching mode power supply 30 in accordance with an embodiment of the present invention.

FIG. 3 schematically shows a switching mode power supply 30 in accordance with an embodiment of the present invention. The switching mode power supply 30 is used to power LED strings. The LED strings are represented by a LED symbol in the FIGs of the present invention for clarification. The switching mode power supply 30 comprises a transformer T1, a power switch QM, a power diode DM, an output capacitor Co, a current sense resistor R1, a mode select resistor R2, a ZCD circuit 31, a first diode D1 and a control circuit 33.

A bridge rectifier comprising four diodes is configured to convert an AC voltage Vac to a rectified voltage Vrec as shown in FIG. 3. An input capacitor Cin is coupled to the output of the bridge rectifier to filter high frequency components. The transformer T1 comprises a primary winding Lp, a secondary winding Ls and a third winding Lt. In the example of FIG. 3, the power switch QM comprises an N-type MOSFET (Metal Oxide Semiconductor Field Effect Transistor) coupled between the primary winding Lp of the transformer T1 and the ground reference. The power diode DM has an anode terminal coupled to the secondary winding Ls, and a cathode terminal coupled to the output capacitor Co. The load, La, the LED strings, is coupled in parallel with the output capacitor Co. In one embodiment, the power diode DM may be replaced by a power switch.

In one embodiment, the rectified voltage Vrec is provided to the control circuit 33 via a voltage divider 32 in order to be within the input range of the control circuit 33. The voltage divider 32 comprises resistors R3 and R4. Persons of ordinary skill in the art should know that if the rectified voltage Vrec is within the input range of the control circuit 33, the voltage divider 32 may be omitted and the rectified voltage Vrec is directly provided to the control circuit 33.

In FIG. 3, the ZCD circuit comprises the third winding Lt of the transformer T1. The voltage across the third winding Lt indicates the voltage across the power switch QM. ZCD function realized by the third winding Lt of the transformer T1 is known to one skilled in the art. Thus the operation of the ZCD circuit is not described here for brevity. Any circuit detecting the voltage across the power switch QM may be used as ZCD circuit without detracting from the merits of the present invention.

In the example of FIG. 3, the current sense resistor R1 is coupled between the power switch QM and the ground reference. When the power switch QM is on, the current flowing through the primary winding Lp also flows through the power switch QM and the current sense resistor R1. So the voltage across the current sense resistor R1 represented by the current sense signal Vcs, indicates the current flowing through the power switch QM.

In the example of FIG. 3, the mode select resistor R2 is coupled between the multi-function pin MUL and the current sense resistor R1. In the startup period of the switching mode power supply 30, a current provided by the control circuit 33 flows through the mode select resistor R2 and the current sense resistor R1 via the multi-function pin MUL, to build the mode select signal MS across the mode select resistor R2. So the mode select signal MS may be different by selecting the mode select resistor R2 with different resistance so as to implement mode selecting function. The mode select signal MS is actually a voltage across the mode select resistor R2 plus a voltage across the current sense resistor R1. In real application, the resistance of the current sense resistor R1 is much smaller than the resistance of the mode select resistor R2 and the voltage across the current sense resistor R1 could be omitted.

The control circuit 33 comprises the multi-function pin MUL coupled to the mode select resistor R2 and the cathode terminal of the first diode D1 to receive the current sense signal Vcs, the ZCD signal Vz and the mode select signal MS. In one embodiment, the control circuit 33 comprises: a startup detect circuit 331 configured to provide the startup detect signal Vst indicative of whether the control circuit 33 is in the startup period or is in the normal operation period based on the status of the control circuit; a mode control circuit 332 having a first input terminal coupled to the multi-function pin MUL to receive the mode select signal MS, a second input terminal coupled to the startup detect circuit 331 to receive the startup detect signal Vst, a third input terminal configured to receive a mode control reference signal Vmr, and an output terminal configured to provide a mode control signal TSR based on the mode select signal MS, the startup detect signal Vst and the mode control reference signal Vmr; a peak current signal circuit 333 having a first input terminal configured to receive the rectified voltage Vrec, a second input terminal coupled to the mode control circuit 332 to receive the mode control signal TSR, a third input terminal configured to receive a feedback reference signal Vfr, a fourth input terminal coupled to the multi-function pin MUL to receive the current sense signal Vcs, a fifth input terminal configured to receive a switch control signal SW which controls the on and off of the power switch QM, and an output terminal configured to provide a peak current signal Ipeak based on the rectified voltage Vrec, the mode control signal TSR, the feedback reference signal Vfr, the current sense signal yes and the switch control signal SW; a voltage control circuit 334 having a control terminal configured to receive the switch control signal SW, a first input terminal coupled to the multi-function pin MUL to receive the ZCD signal Vz, a second input terminal configured to receive a ZCD reference signal Vcr, and an output terminal configured to provide a voltage control signal ZCD based on the switch control signal SW, the ZCD signal Vz and the ZCD reference signal Vcr; a current control circuit 335 having a control terminal configured to receive the switch control signal SW, a first input terminal coupled to the multi-function pin MUL to receive the current sense signal Vcs, a second input terminal coupled to the peak current signal circuit 333 to receive the peak current signal Ipeak, and an output terminal configured to provide a current control signal Ilim based on the switch control signal SW, the current sense signal Vcs and the peak current signal Ipeak; and a logic circuit 336 having a first input terminal coupled to the voltage control circuit 334 to receive the voltage control signal ZCD, a second input terminal coupled to the current control circuit 335 to receive the current control signal Ilim, and an output terminal configured to provide the switch control signal SW based on the voltage control signal ZCD and the current control signal Ilim.

In one embodiment, in the startup period of the switching mode power supply 30, the control circuit 33 compares the mode select signal MS with the mode control reference signal Vmr, and determines the work mode of the switching mode power supply 30 based on the comparison result; in the normal operation period of the switching mode power supply 30, the control circuit 33 compares the signal received by the multi-function pin MUL, i.e., the current sense signal Vcs, with the peak current signal Ipeak when the power switch QM is on, and compares the signal received by the multi-function pin MUL with the ZCD reference signal Vcr when the power switch QM is off, and controlling the on and off of the power switch QM based on the comparison results.

In one embodiment, the peak current signal circuit 333 comprises: a current average circuit 338 having a first input terminal coupled to the multi-function pin MUL to receive the current sense signal Vcs, a second input terminal configured to receive the switch control signal SW, and an output terminal configured to provide a current average signal Iay based on the current sense signal Vcs and the switch control signal; an error amplifier 339 having a first input terminal (inverting input terminal) coupled to the current average circuit 338 to receive the current average signal Iay, a second input terminal (non-inverting input terminal) configured to receive the feedback reference signal Vfr, and an output terminal configured to provide an error amplify signal Vc based on the current average signal Iay and the feedback reference signal Vfr; an input voltage process circuit 337 having a first input terminal configured to receive the rectified voltage Vrec, a second input terminal coupled to the mode control circuit 332 to receive the mode control signal TSR, and an output terminal configured to provide a PFC (Power Factor Correction) reference signal Vpf based on the rectified voltage Vrec and the mode control signal TSR; and a first multiply circuit 340 having a first input terminal coupled to the input voltage process circuit 337 to receive the PFC reference signal Vpf, and a second input terminal coupled to the error amplifier 339 to receive the error amplify signal Vc, and an output terminal configured to provide the peak current signal Ipeak based on the PFC reference signal Vpf and the error amplify signal Vc.

The current average signal Iay provided by the current average circuit 338 indicates an output current of the switching mode power supply 30, In the example of FIG. 3, the LED strings, as the load of the switching mode power supply 30, is driven by a constant current. So the current average signal Iay indicative of the output current of the switching mode power supply 30 should participate in the control scheme. When the power switch QM is on, the current average circuit 338 receives the current sense signal Vcs via the multi-function pin MUL. Then the current average circuit 338 performs an arithmetical operation on the current sense signal Vcs and the switch control signal SW to generate the current average signal Iay, Persons of ordinary skill in the art should know that the current average signal Iay may be obtained by other ways. Any circuit generating the current average signal Iay indicative of the output current of the switching mode power supply may be used without detracting from the merits of the present invention.

In one embodiment, the voltage control circuit 334 comprises a first comparator having an enable terminal configured to receive the switch control signal SW, a first input terminal (inverting input terminal) configured to receive the ZCD reference signal Vcr, a second input terminal (non-inverting input terminal) coupled to the multi-function pin MUL to receive the ZCD signal Vz, and an output terminal configured to provide the voltage control signal ZCD based on the switch control signal SW, the ZCD reference signal Vcr and the ZCD signal Vz. The first comparator is enabled when the power switch is turned off by the switch control signal SW. At this time, the signal received by the multi-function pin MUL is the ZCD signal Vz. Based on the comparison of the ZCD signal Vz and the ZCD reference signal Vcr, the first comparator generates the voltage control signal ZCD.

In one embodiment, the current control circuit 335 comprises a second comparator having an enable terminal configured to receive the switch control signal SW, a first input terminal (inverting input terminal) coupled to the peak current signal circuit 333 to receive the peak current signal Ipeak, a second input terminal (non-inverting input terminal) coupled to the multi-function pin MUL to receive the current sense signal Vcs, and an output terminal configured to generate the current control signal Ilim based on the switch control signal SW, the peak current signal Ipeak and the current sense signal Vcs. The second comparator is enabled when the power switch QM is turned on by the switch control signal SW. At this time, the signal received by the multi-function pin MUL is the current sense signal Vcs. Based on the comparison of the current sense signal Vcs and the peak current signal Ipeak, the second comparator generates the current control signal Ilim.

In one embodiment, the startup detect circuit 331 determines if the switching mode power supply 30 is in the normal operation period or is in the startup period by detecting if the voltage across the third winding Lt reaches a threshold voltage. In one embodiment, the startup detect circuit 331 determines if the switching mode power supply 30 is in the normal operation period or is in the startup period by detecting if the error amplify signal Vc reaches a threshold voltage. The startup detect circuit 331 is known to persons of ordinary skill in the art and is not described here for brevity.

In one embodiment, the logic circuit 336 comprises a first RS flip-flop FF1. The first RS flip-flop FF1 has a set terminal "S" coupled to the voltage control circuit 334 to receive the voltage control signal ZCD, a reset terminal "R" coupled to the current control circuit 335 to receive the current control signal Him, and an output terminal configured to generate the switch control signal SW to control the power switch QM based on the voltage control signal ZCD and the current control signal Ilim.

Figure 4:
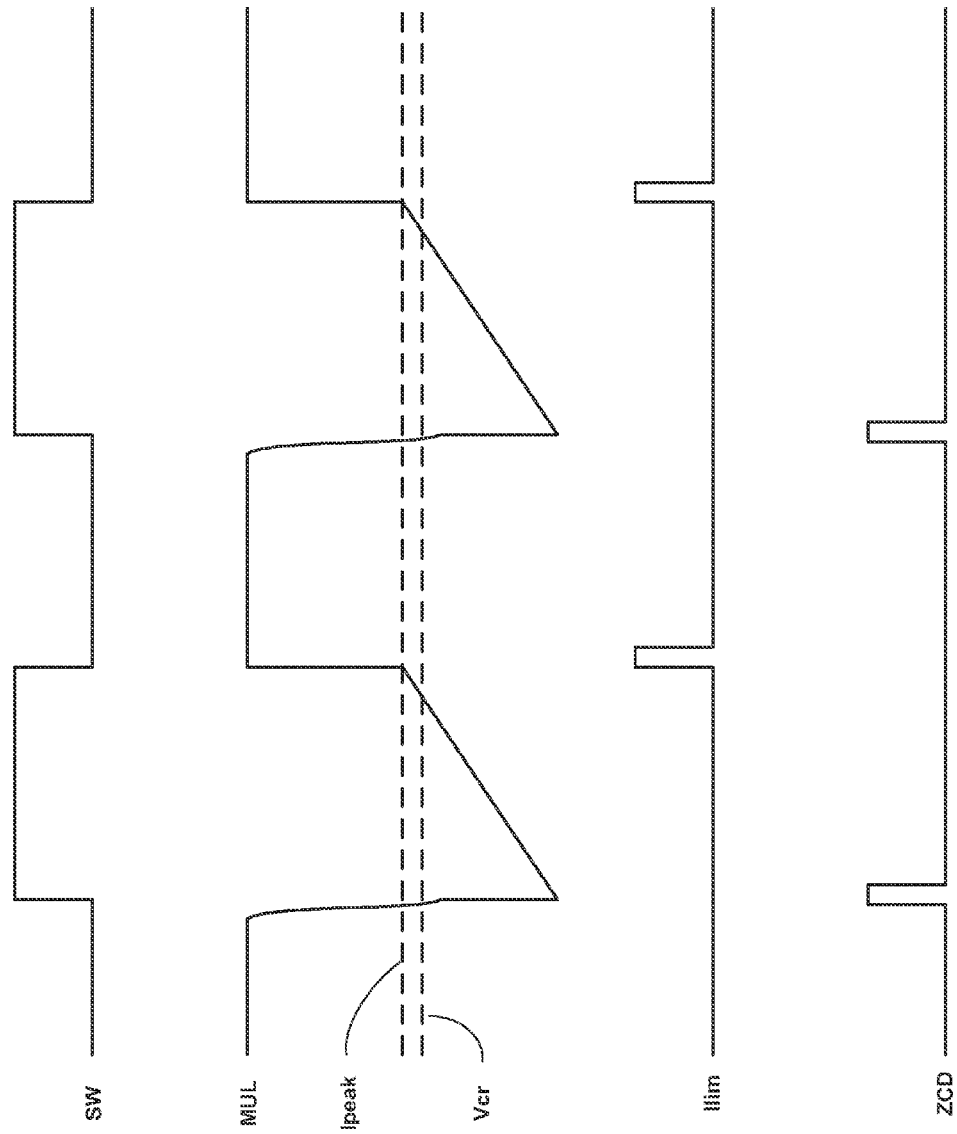
FIG. 4 shows waveforms of some signals of the circuit in FIG. 3 while the circuit is in the normal operation period.

FIG. 4 shows waveforms of some signals of the circuit in FIG. 3 while the circuit is in the normal operation period. The operation of the circuit in FIG. 3 is described with reference to FIGS. 3 and 4. In one embodiment, when the power switch QM is on, i.e., the switch control signal SW is logical high, the current flowing through the primary winding Lp increases. As a result, the voltage across the current sense resistor R1, i.e., the current sense signal Vcs received by the multi-function pin MUL, increases from zero as shown in FIG. 4. The second comparator is enabled to compare the current sense signal Vcs with the peak current signal Ipeak to generate the current control signal Him. As shown in FIG. 4, the second comparator flips to provide a pulse when the current sense signal Vcs reaches the peak current signal Ipeak. As a result, the switch control signal SW provided by the first RS flip-flop FF1 is turned to be logical low. Then the power switch QM is turned off. At this time, the signal received by the multi-function pin MUL is ZCD signal Vz. Meanwhile, the first comparator is enabled to compare the ZCD signal Vz with the ZCD reference signal Vcr to generate the voltage control signal ZCD. The ZCD signal Vz reaches the ZCD reference signal Vcr when the voltage across the power switch QM decreases to minimum during the resonance of the primary winding Lp and a parasitic capacitor of the power switch QM. As a result, the first comparator flips to generate a pulse to set the first RS flip-flop FF1. Then the switch control signal SW is turned to be logical high to turn on the power switch QM. Meanwhile, the first comparator is disabled while the second comparator is enabled. The signal now received by the multi-function pin MUL is current sense signal Vcs again, and a next switching cycle of the switching mode power supply 30 begins. Then the operation repeats.

Figure 5:
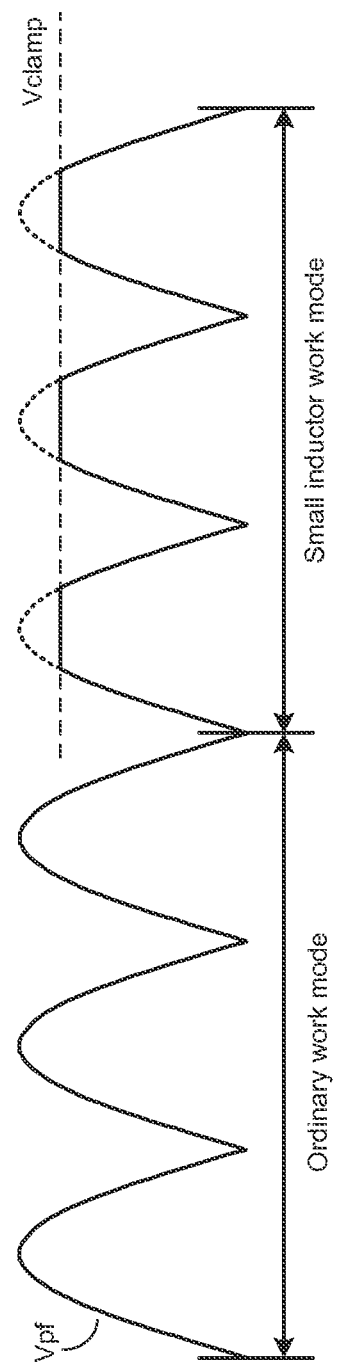
FIG. 5 shows the waveform of PFC reference signal Vpf during when the switching mode power supply 30 respectively works under the ordinary work mode or works under the small inductor work mode.

In one embodiment, the switching mode power supply 30 has two work modes. One is ordinary work mode and the other one is small inductor work mode. FIG. 5 shows the waveform of the PFC reference signal Vpf during when the switching mode power supply 30 respectively works under the ordinary work mode or works under the small inductor work mode. During when the switching mode power supply 30 works under ordinary work mode, the rectified voltage Vrec is directly adopted as the PFC reference signal Vpf and is provided to the first multiply circuit 340. The first multiply circuit 340 multiplies the PFC reference signal Vpf with the error amplify signal Vc to generate the peak current signal Ipeak. During when the switching mode power supply 30 works under the small inductor work mode, the input voltage process circuit 337 receives the rectified voltage Vrec, and clamps the rectified voltage Vrec at a clamp reference signal Vclamp when the rectified voltage Vrec is larger than the clamp reference signal Vclamp as shown in FIG. 5. The clamped signal is provided to the first multiply circuit 340 as the PFC reference signal Vpf. Under the small inductor work mode, a smaller transformer could be chosen without influencing the power factor of the system.

Figure 6:
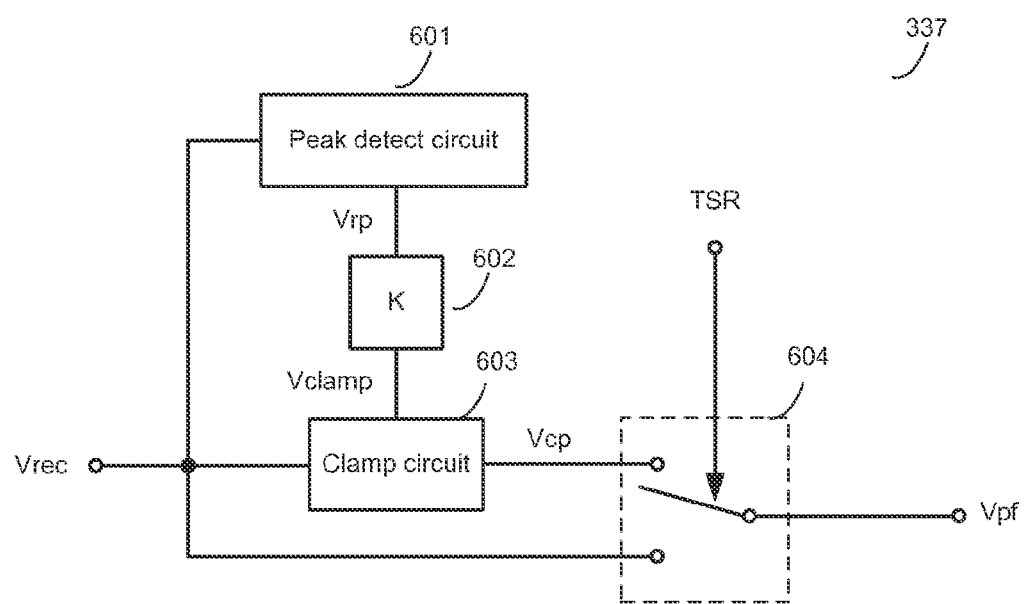
FIG. 6 schematically shows the input voltage process circuit 337 in according with an embodiment of the present invention.

FIG. 6 schematically shows the input voltage process circuit 337 in according with an embodiment of the present invention. The input voltage process circuit 337 comprises: a peak detect circuit 601 having an input terminal configured to receive the rectified voltage Vrec, and an output terminal configured to provide a peak detect signal Vrp indicative of the peak value of the rectified voltage Vrec based on the rectified voltage Vrec; a second multiply circuit 602 having an input terminal coupled to the peak detect circuit 601 to receive the peak detect signal Vrp, and an output terminal configured to generate the damp reference signal Vclamp based on the peak detect signal Vrp, wherein the damp reference signal Vclamp is a product of the peak detect signal and a coefficient smaller than 1; a damp circuit 603 having a first input terminal coupled to the second multiply circuit 602 to receive the damp reference signal Vclamp, a second input terminal configured to receive the rectified voltage Vrec, and an output terminal configured to provide the clamped signal Vcp based on the clamp reference signal Vclamp and the rectified voltage Vrec; and a first select circuit 604 having a control terminal configured to receive the mode control signal TSR, a first input terminal coupled to the clamp circuit 603 to receive the clamped signal Vcp, a second input terminal configured to receive the rectified voltage Vrec, and an output terminal configured to provide the clamped signal Vcp or the rectified voltage Vrec as the PFC reference signal Vpf based on the mode control signal TSR.

In one embodiment, the peak detect circuit 601 detects the peak value of the rectified voltage Vrec of the previous switching cycle to get the peak detect signal Vrp. Then the second multiply circuit 602 multiplies the peak detect signal Vrp with the coefficient K which is smaller than 1 to get the clamp reference signal Vclamp. The coefficient K may be different in different systems. The clamp circuit 603 receives the rectified voltage Vrec, and clamps the rectified voltage Vrec at the clamp reference signal Vclamp when the rectified voltage Vrec is larger than the clamp reference signal Vclamp to get the clamped signal Vcp. Then based on the mode select signal TSR, the clamped signal Vcp or the rectified voltage Vrec is selected to be the PFC reference signal Vpf. As can be seen from FIG. 5, the rectified voltage Vrec is selected to be the PFC reference signal Vpf during when the switching mode power supply 30 works under the ordinary work mode, while the damped signal Vcp is selected to the PFC reference signal Vpf during when the switching mode power supply 30 works under the small inductor work mode.

In one embodiment, the work mode is determined by the resistance of the mode select resistor R2.

Figure 7:
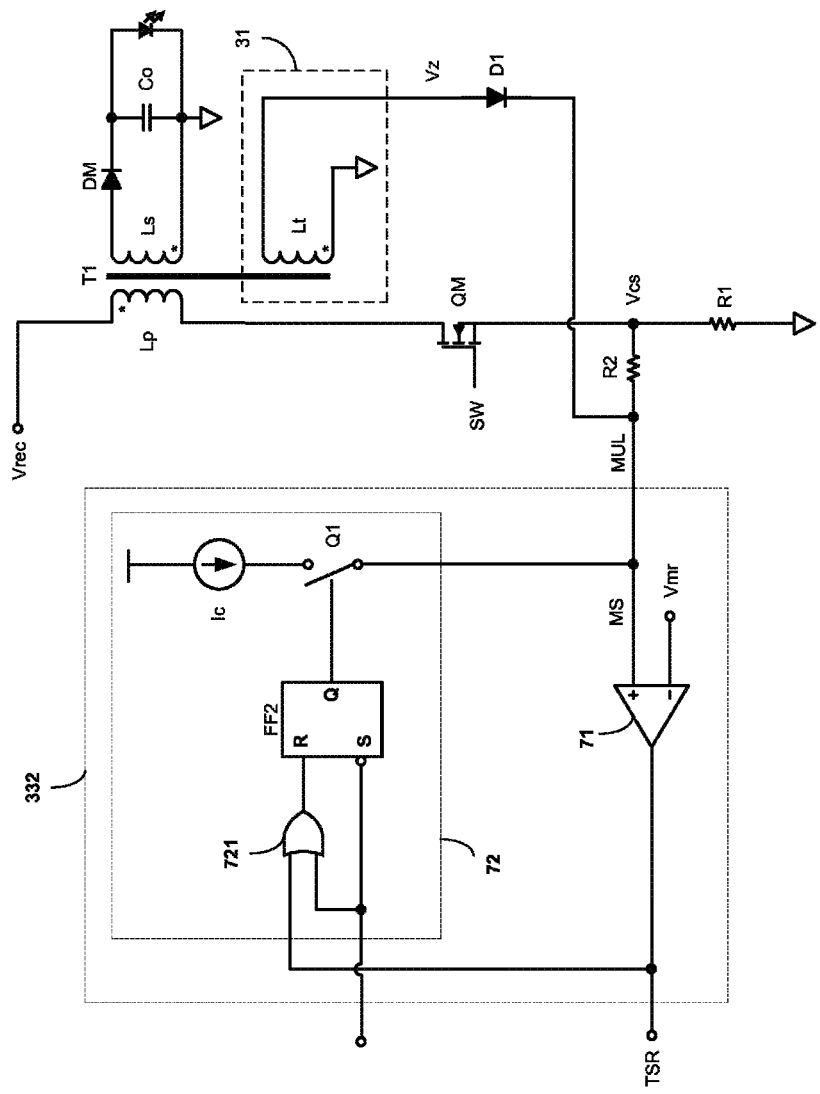
FIG. 7 schematically shows the mode control circuit 332 in accordance with an embodiment of the present invention.

FIG. 7 schematically shows the mode control circuit 332 in accordance with an embodiment of the present invention. The mode control circuit 332 comprises: a mode select comparator 71 having a first input terminal (non-inverting input terminal) coupled to the multi-function pin MUL to receive the mode select signal MS, a second input terminal (inverting input terminal) configured to receive the mode control reference signal Vmr, and an output terminal configured to provide the mode control signal TSR based on the mode select signal MS and the mode control reference signal Vmr; and the charge circuit 72 having a first input terminal configured to receive the startup detect signal Vst, a second input terminal coupled to the mode select comparator 71 to receive the mode control signal TSR, and an output terminal coupled to the multi-function pin MUL to provide a current to the multi-function pin MUL based on the startup detect signal Vst and the mode control signal TSR. In one embodiment, the current is provided to the multi-function pin MUL only when the startup detect signal Vst is valid, i.e., the startup detect signal Vst indicates that the switching mode power supply 30 is in the startup period. The current provided by the multi-function pin MUL flows through the mode select resistor R2 and the current sense resistor R1 to build the mode select signal MS at the multi-function pin MUL. The mode select signal MS could be different by changing the resistance of the mode select resistor R2, so as to implement the mode selecting function.

To prevent current flowing from the multi-function pin MUL to the ZCD circuit 31, the first diode D1 is coupled between the ZCD circuit 31 and the multi-function pin MUL with an anode terminal coupled to the ZCD circuit 31 and a cathode terminal coupled to the multi-function pin MUL.

In one embodiment, when the mode select resistor R2 has a smaller resistance, the switching mode power supply 30 works under small inductor work mode; when the mode select resistor R2 has a larger resistance, the switching mode power supply 30 works under ordinary work mode. That is to say, when the mode select signal MS is smaller than the mode control reference signal Vmr, the switching mode power supply 30 works under small inductor work mode; when the mode select signal MS is larger than the mode control reference signal Vmr, the switching mode power supply 30 works under ordinary work mode. In some embodiments, it's the opposite. The resistance of the mode select resistor R2, the current provided by the charge circuit 72 and the value of the mode control reference signal Vmr could be adjusted according to the system parameters. Any circuit that selects the work mode by changing the resistance of the mode select resistor R2 may be used without detracting from the merits of the present invention.

In one embodiment, the charge circuit 72 comprises: an OR gate 721 having a first input terminal coupled to the mode select comparator 71 to receive the mode control signal TSR, a second input terminal configured to receive the startup detect signal Vst, and an output terminal configured to provide the OR result of the mode control signal TSR and the startup detect signal Vst; a second RS flip-flop FF2 having a set terminal "S" configured to receive the startup detect signal Vst, a reset terminal "R" coupled to the output terminal of the OR gate 721; a current source Ic having an input terminal coupled to a power voltage of the control circuit 33, and an output terminal configured to provide a current; and a switch Q1 having a first terminal coupled to the current source Ic to receive the current, a second terminal coupled to the multi-function pin MUL, and a control terminal coupled to the output terminal of the second flip-flop FF2.

Figure 8:
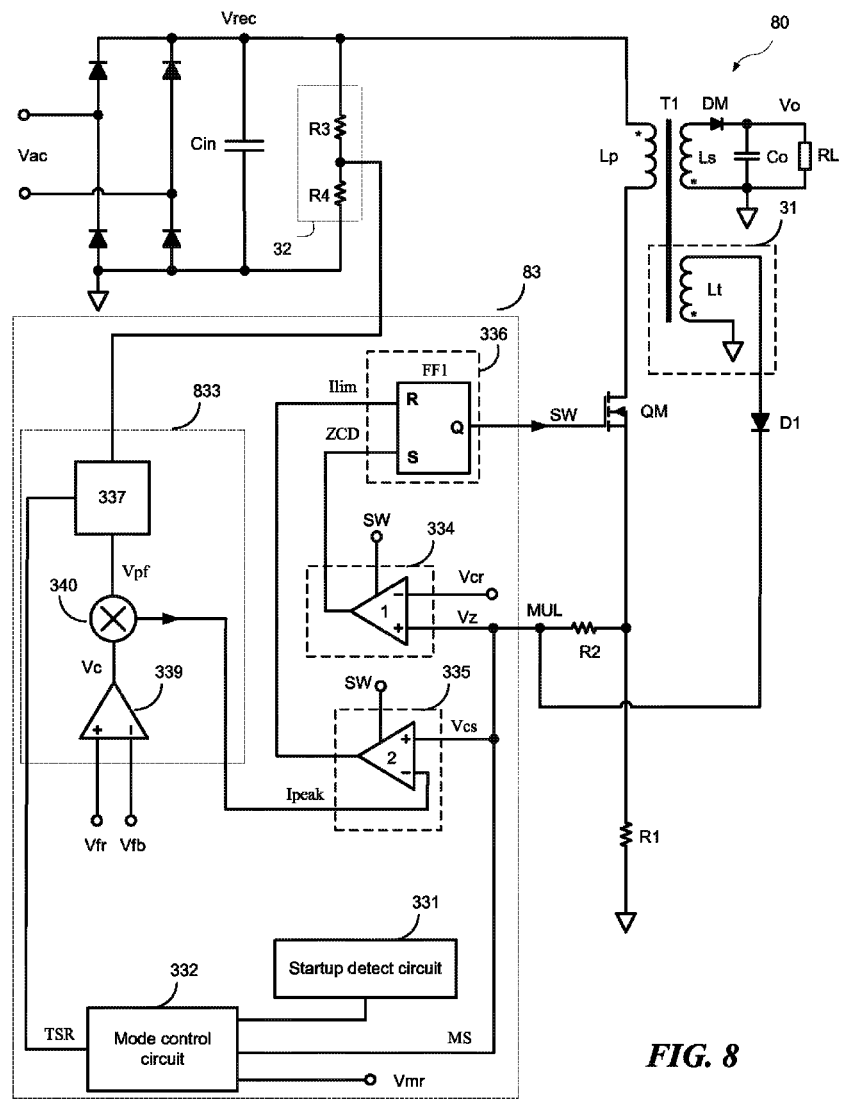
FIG. 8 schematically shows a switching mode power supply 80 in accordance with an embodiment of the present invention.

In one embodiment, the startup detect signal Vst is logical low in the startup period. Thus in the startup period, the second RS flip-flop FF2 is set to turn on the switch Q1. As a result, the current provided by the current source Ic flows to the mode select resistor R2 and the current sense resistor R1 via the multi-function pin MUL. The startup detect signal Vst is logical high in the normal operation period of the switching mode power supply 30. So in the normal operation period, the second RS flip-flop is reset to turn off the switch Q1. As a result, the current source Ic and the multi-function pin MUL is disconnected and there is no current flows to the mode select resistor R2. Any circuit that provides current to the mode select resistor R2 via the multi-function pin MUL in the startup period may be used without detracting from the merits of the present invention, FIG. 8 schematically shows a switching mode power supply 80 in accordance with an embodiment of the present invention. Unlike the switching mode power supply 30 in FIG. 3, the switching mode power supply 80 provides a constant output voltage Vo to the load represented by a resistor RL. Thus, a feedback signal Vfb indicative of the output voltage Vo instead of the current average signal Iav is provided to the peak current signal circuit to participate in the control scheme. The switching mode power supply 80 has the similar structure with the switching mode power supply 30 except for the peak current signal circuit. The peak current signal circuit 833 in FIG. 8 comprises: the error amplifier 339 having a first input terminal (inverting input terminal) configured to receive the feedback signal Vfb indicative of the output voltage Vo, a second input terminal (non-inverting input terminal) configured to receive the feedback reference signal Vfr, and an output terminal configured to provide the error amplify signal Vc based on the feedback signal Vfb and the feedback reference signal Vfr; the input voltage process circuit 337 having a first input terminal configured to receive the rectified voltage Vrec, a second input terminal coupled to the mode control circuit 332 to receive the mode control signal TSR, and an output terminal configured to provide the PFC reference signal Vpf based on the rectified voltage Vrec and the mode control signal TSR; and the first multiply circuit 340 having a first input terminal coupled to the input voltage process circuit 337 to receive the PFC reference signal Vpf, a second input terminal coupled to the error amplifier 339 to receive the error amplify signal Vc, and an output terminal configured to provide the peak current signal Ipeak based on the PFC reference signal Vpf and the error amplify signal Vc.

The operation of the switching mode power supply 80 is similar to the operation of the switching mode power supply 30 and is not described here for brevity.

Figure 9:
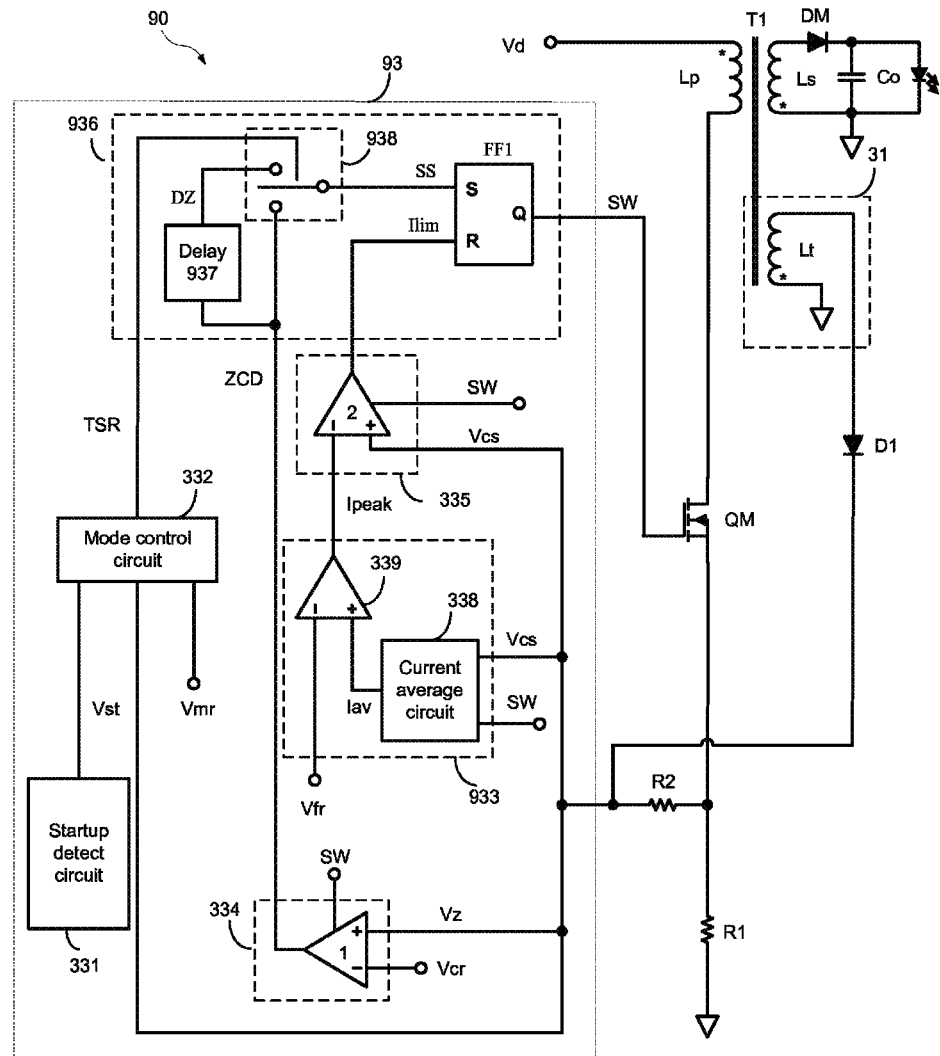
FIG. 9 schematically shows a switching mode power supply 90 in accordance with an embodiment of the present invention.

FIG. 9 schematically shows a switching mode power supply 90 in accordance with an embodiment of the present invention. Similar with the switching mode power supply 30, the switching mode power supply 90 provides a constant current to the load, and may be adopted to drive the LED strings. Thus the current average signal Iav indicative of the output current of the switching mode power supply 90 participates in the control scheme. The switching mode power supply 90 comprises the transformer T1, the power switch QM, the power diode DM, the output capacitor Co, the current sense resistor R1, the mode select resistor R2, the ZCD circuit 31, the first diode D1 and the control circuit 93.

In one embodiment, the control circuit 93 comprises: the startup detect circuit 331 configured to provide the startup detect signal Vst indicating if the control circuit 93 is in the startup period or is in the normal operation period; the mode control circuit 332 having a first input terminal coupled to the multi-function pin MUL to receive the mode select signal MS, a second input terminal coupled to the startup detect circuit 331 to receive the startup detect signal Vst, a third input terminal configured to receive the mode control reference signal Vmr, and an output terminal configured to provide a mode control signal TSR based on the mode select signal MS, the startup detect signal Vst and the mode control reference signal Vmr; a peak current signal circuit 933 having a first input terminal configured to receive the feedback reference signal Vfr, a second input terminal coupled to the multi-function pin MUL to receive the current sense signal Vcs, a third input terminal configured to receive the switch control signal SW, and an output terminal configured to provide a peak current signal Ipeak based on the feedback reference signal Vfr, the current sense signal Vcs and the switch control signal SW; the voltage control circuit 334 having a control terminal configured to receive the switch control signal SW, a first input terminal coupled to the multi-function pin MUL to receive the ZCD signal Vz, a second input terminal configured to receive the ZCD reference signal Vcr, and an output terminal configured to provide the voltage control signal ZCD based on the switch control signal SW, the ZCD signal Vz and the ZCD reference signal Vcr; a current control circuit 335 having a control terminal configured to receive the switch control signal SW, a first input terminal coupled to the multi-function pin MUL to receive the current sense signal Vcs, a second input terminal coupled to the peak current signal circuit 933 to receive the peak current signal Ipeak, and an output terminal configured to provide the current control signal Ilim based on the switch control signal SW, the current sense signal Vcs and the peak current signal Ipeak; and a logic circuit 936 having a first input terminal coupled to the voltage control circuit 334 to receive the voltage control signal ZCD, a second input terminal coupled to the current control circuit 335 to receive the current control signal Ilim, a third input terminal coupled to the mode control circuit 332 to receive the mode control signal TSR, and an output terminal configured to provide the switch control signal SW based on the voltage control signal ZCD, the current control signal Ilim and the mode control signal TSR.

The input voltage of the switching mode power supply 90 is a DC voltage Vd. In one embodiment, the peak current signal circuit 933 comprises: the current average circuit 338 having a first input terminal coupled to the multi-function pin MUL to receive the current sense signal Vcs, a second input terminal configured to receive the switch control signal SW, and an output terminal configured to provide the current average signal Iav based on the current sense signal Vcs and the switch control signal SW; and the error amplifier 339 having a first input terminal (non-inverting input terminal) coupled to the current average circuit 338 to receive the current average signal Iav, a second input terminal (inverting input terminal) configured to receive the feedback reference signal Vfr, and an output terminal configured to provide the peak current signal Ipeak based on the current average signal Iav and the feedback reference signal Vfr.

In one embodiment, the logic circuit 936 comprises: a delay circuit 937 having an input terminal coupled to the voltage control circuit 334 to receive the voltage control signal ZCD and an output terminal configured to provided a delayed voltage control signal DZ based on the voltage control signal ZCD; a second select circuit 938 having a control terminal coupled to the mode control circuit 332 to receive the mode control signal TSR, a first input terminal coupled to the voltage control circuit 334 to receive the voltage control signal ZCD, a second input terminal coupled to the delay circuit 937 to receive the delayed voltage control signal DZ, and an output terminal configured to provide the voltage control signal ZCD or the delayed voltage control signal DZ as a set signal SS based on the mode control signal TSR; and the first RS flip-flop FF1 having a set terminal "S" coupled to the output terminal of the second select circuit 938 to receive the set signal SS, a reset terminal "R" coupled to the current control circuit 335 to receive the current control signal Him, and an output terminal configured to provide the switch control signal SW based on the set signal SS provided by the second select circuit 938 and the current control signal Ilim.

The switching mode power supply 90 has two work modes, wherein one is the Boundary Current Mode (BCM), and the other one is the Discontinuous Current Mode (DCM). During when the switching mode power supply 90 works under BCM, the second select circuit 938 provides the voltage control signal ZCD to the set terminal "S" of the first RS flip-flop FF1, During when the switching mode power supply 90 works under DCM, the second select circuit 938 provides the delayed voltage control signal DZ to the set terminal "S" of the first RS flip-flop FF1. The delayed time between the voltage control signal ZCD and the delayed voltage control signal DZ may be different in different system.

When the work mode of the switching mode power supply 90 is determined, the operation of the switching mode power supply 90 is similar with the operation of the switching mode power supply 30, that is: when the power switch QM is on, i.e., the switch control signal SW is logical high, the current flowing through the primary winding Lp increases. As a result, the voltage across the current sense resistor R1, i.e., the current sense signal Vcs received by the multi-function pin MUL, increases from zero as shown in FIG. 4. The second comparator is enabled to compare the current sense signal Vcs with the peak current signal Ipeak to generate the current control signal Him. As shown in FIG. 4, the second comparator flips to provide a pulse when the current sense signal Vcs reaches the peak current signal Ipeak. As a result, the switch control signal SW provided by the first RS flip-flop FF1 is turned to be logical low. Then the power switch QM is turned off. At this time, the signal received by the multi-function pin MUL is ZCD signal Vz. Meanwhile, the first comparator is enabled to compare the ZCD signal Vz with the ZCD reference signal Vcr to generate the voltage control signal ZCD. The ZCD signal Vz reaches the ZCD reference signal Vcr when the voltage across the power switch QM decreases to minimum during the resonance of the primary winding Lp and the parasitic capacitor of the power switch QM. As a result, the first comparator flips to generate a pulse to set the first RS flip-flop FF1. Then the switch control signal SW is turned to be logical high to turn on the power switch QM. When the switching mode power supply 90 works under BCM, the pulse of the voltage control signal ZCD sets the first RS flip-flop FF1. In a similar way, when the switching mode power supply 90 works under DCM, the pulse of the delayed voltage control signal DZ sets the first RS flip-flop FF1. Once the power switch QM is on, the first comparator is disabled while the second comparator is enabled. The signal now received by the multi-function pin MUL is the current sense signal Vcs again, and a next switching cycle of the switching mode power supply 90 begins. Then the operation repeats.

Figure 10:
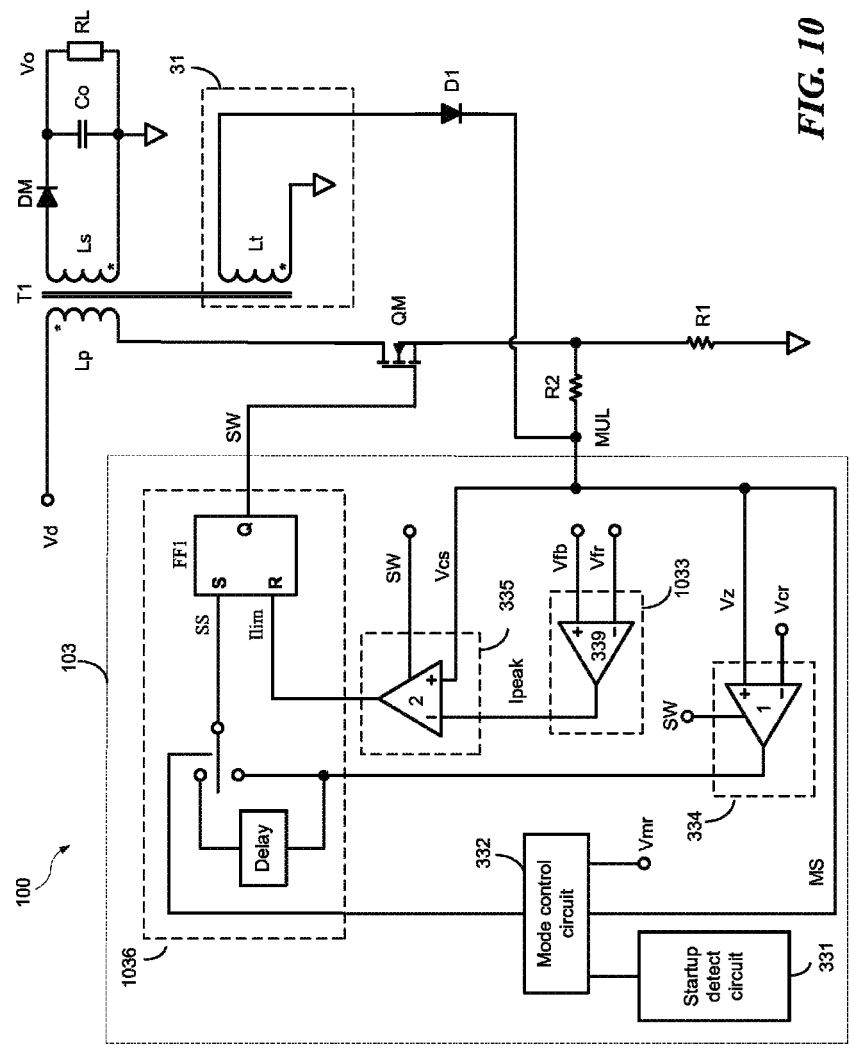
FIG. 10 schematically shows a switching mode power supply 100 in accordance with an embodiment of the present invention.

FIG. 10 schematically shows a switching mode power supply 100 in accordance with an embodiment of the present invention. Similar with the switching mode power supply 80, the switching mode power supply 100 provides a constant output voltage Vo to the load represented by the resistor RL. Thus the current average signal Iav indicative of the output current of the switching mode power supply 90 is replaced by the feedback signal Vfb indicative of the output voltage of the switching mode power supply 100. The structure of the switching mode power supply 100 is similar with the structure of the switching mode power supply 90 except for the peak current signal circuit. The peak current signal circuit 1033 in FIG. 10 having a first input terminal configured to receive the feedback signal Vfb indicative of the output voltage Vo, a second input terminal configured to receive the feedback reference signal Vfr, and an output terminal configured to provide the peak current signal Ipeak based on the feedback signal Vfb and the feedback reference signal Vfr. In one embodiment, the peak current signal circuit 1033 comprises the error amplifier 339.

The operation of the switching mode power supply 100 is similar with the operation of the switching mode power supply 90 and is not described here for brevity.

Persons of ordinary skill in the art know that there are many other ways in detect the current flowing through the power switch QM. For example, the current may be detected by a current mirror circuit coupled in parallel to the power switch QM and so on. Thus, the current sense resistor R1 may be omitted.

Figure 11:
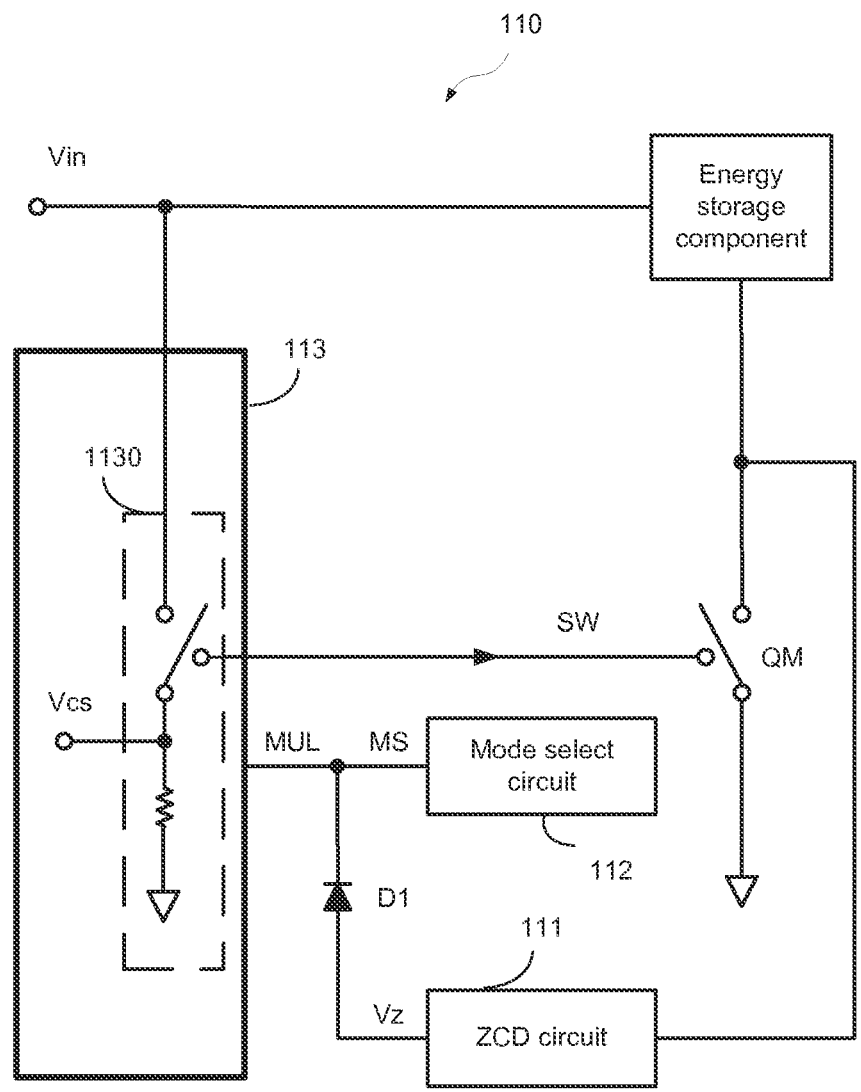
FIG. 11 schematically shows a switching mode power supply 110 in accordance with an embodiment of the present invention.

FIG. 11 schematically shows a switching mode power supply 110 in accordance with an embodiment of the present invention. As shown in FIG. 11, the switching mode power supply 110 comprises: a power switch QM; an energy storage component coupled to the power switch QM, wherein the energy storage component stores energy when the power switch QM is turned on and transfers energy when the power switch QM is turned off; a mode select circuit 112 configured to provide the mode select signal MS; a ZCD circuit 111 configured to provide the ZCD signal Vz based on the voltage across the power switch QM; a first diode D1 having an anode terminal and a cathode terminal, wherein the anode terminal is coupled to the ZCD circuit 111 to receive the ZCD signal Vz; and a control circuit 113 configured to control the power switch QM, wherein the control circuit 113 has a multi-function pin MUL coupled to the mode select circuit 112 and the cathode terminal of the first diode D1; wherein: in the startup period of the switching mode power supply 110, the control circuit 113 compares the mode select signal MS with a mode control reference signal Vmr and determines the work mode of the switching mode power supply 110 based on the comparison result; and in the normal operation period of the switching mode power supply 110, the control circuit 113 compares the signal received by the multi-function pin MUL, i.e., the ZCD signal Vz, with ZCD reference signal Vzr, and turns on the power switch QM based on the comparison result.

In one embodiment, the mode select circuit 112 comprises a resistor. The control circuit 113 selects the work mode based on the resistance of the resistor.

In one embodiment, the mode select circuit 112 comprises a voltage source. The voltage source provides different voltage signal to the multi-function pin MUL to determine the work mode of the switching mode power supply.

In one embodiment, a current mirror circuit 1130 may be coupled in parallel to the power switch QM to detect the current flowing through the power switch QM. The current mirror circuit 1130 may be integrated into the control circuit 113. The structure of the switching mode power supply 110 is similar with the structure of switching mode power supplies 30, 80, 90 and 100. Meanwhile, the control circuit 1130 is similar with the control circuit 33, 83, 93 or 103 except for the way of obtaining the current sense signal Vcs.

Detecting the zero cross point of the voltage across the power switch QM is not necessary to the switching mode power supply without Quasi-Resonant control.

Figure 12:
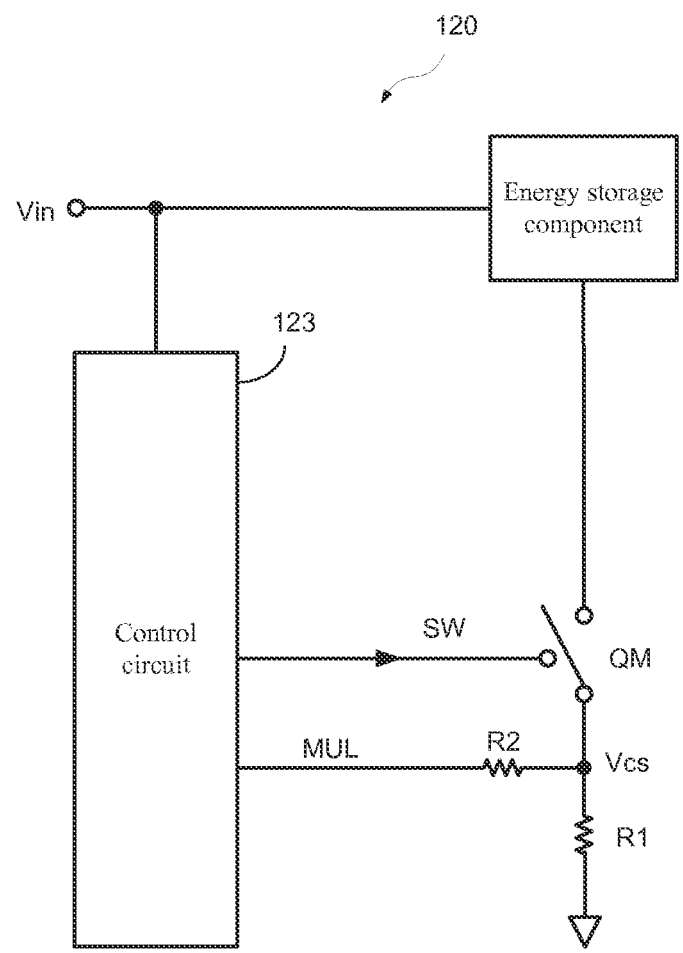
FIG. 12 schematically shows a switching mode power supply 120 in accordance with an embodiment of the present invention.

FIG. 12 schematically shows a switching mode power supply 120 in accordance with an embodiment of the present invention. As shown in FIG. 12, the switching mode power supply 120 comprises: the power switch QM; an energy storage component coupled to the power switch QM, wherein the energy storage component stores energy when the power switch QM is turned on and transfers energy when the power switch QM is turned off; a current sense resistor R1 coupled between the power switch QM and the ground reference to sense the current flowing through the power switch QM and to provide the current sense signal Vcs based thereupon; a mode select resistor R2 having a first terminal and a second terminal, wherein the first terminal is coupled to the connection node of the current sense resistor R1 and the power switch QM; and a control circuit 123 configured to control the power switch QM, wherein the control circuit 123 has a multi-function pin MUL coupled to the second terminal of the mode select resistor R2; wherein: in the startup period of the switching mode power supply 120, the control circuit 123 compares the mode select signal MS with the mode control reference signal Vmr and determines the work mode of the switching mode power supply 120 based on the comparison result; in the normal operation period of the switching mode power supply 120, the control circuit 123 compares the signal received by the multi-function pin MUL, i.e., the current sense signal Vcs with the peak current signal Ipeak and turns off the power switch based on the comparison result.

The structure of the switching mode power supply 120 is similar with the structure of switching mode power supplies 30, 80, 90 and 100. Meanwhile the control circuit 123 is similar with the control circuits 33, 83, 93 or 103 except for that the voltage control signal ZCD in the control circuits 33, 83, 93 and 103 may be replaced by an oscillation signal.

The present invention discloses a switching mode power supply which receives several signals by a multi-function pin. As a result, the system structure and the peripheral circuit are simplified. Also, the cost and size of the circuit are saved.

Figure 13:
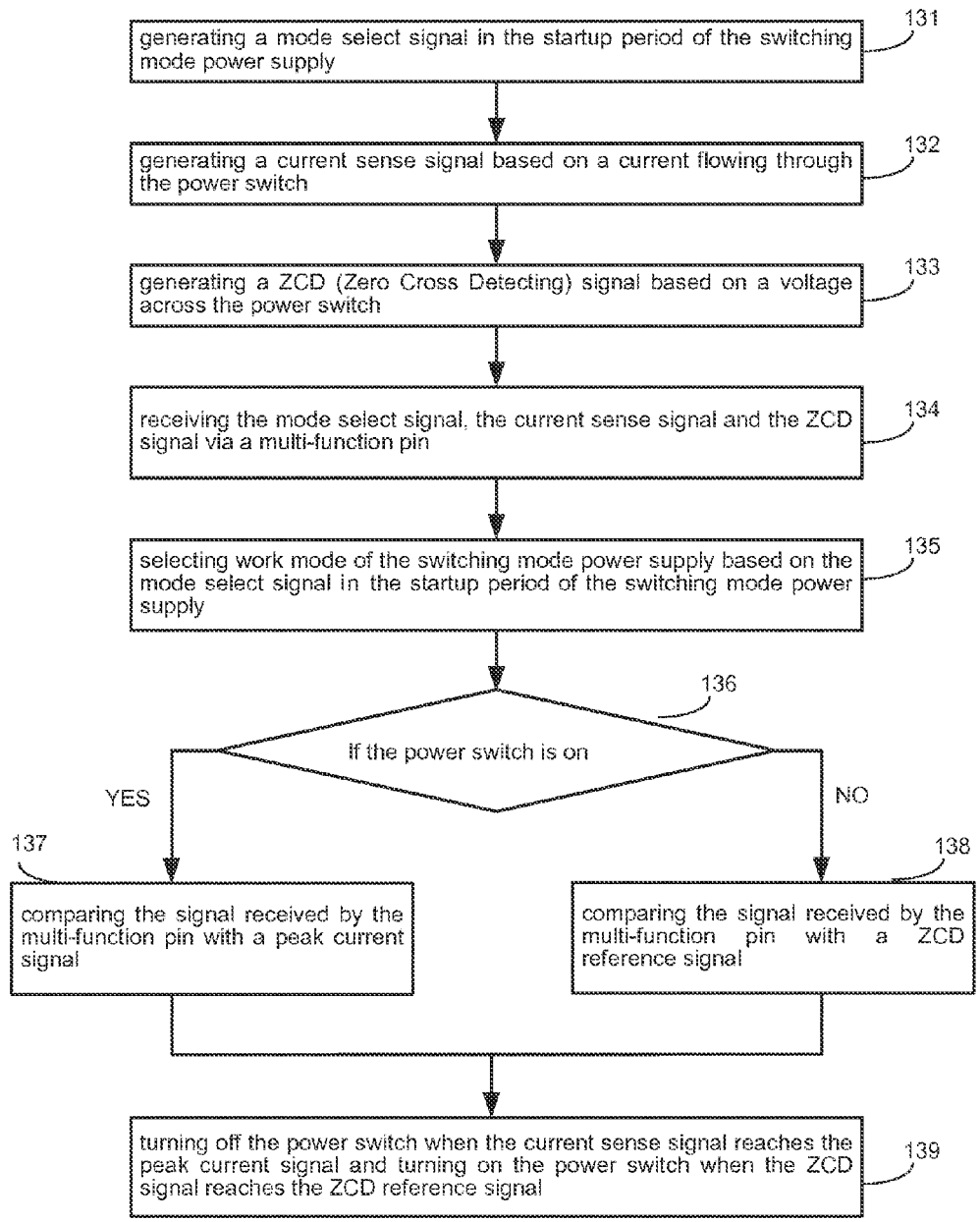
FIG. 13 shows a control method 130 for a switching mode power supply in accordance with an embodiment of the present invention.

FIG. 13 shows a control method 130 for a switching mode power supply in accordance with an embodiment of the present invention. The switching mode power supply may comprise a power switch, an energy storage component and a control circuit. The control method 130 comprises: step 131, generating a mode select signal in the startup period of the switching mode power supply; step 132, generating a current sense signal based on a current flowing through the power switch; step 133, generating a ZCD (Zero Cross Detecting) signal based on a voltage across the power switch; step 134, receiving the mode select signal, the current sense signal and the ZCD signal via a multi-function pin; step 135, selecting work mode of the switching mode power supply based on the mode select signal in the startup period of the switching mode power supply; step 136, if the power switch is on, go to step 137, otherwise, go to step 138; step 137, comparing the signal received by the multi-function pin, i.e., the current sense signal, with a peak current signal; step 138, comparing the signal received by the multi-function pin, i.e., the ZCD signal, with a ZCD reference signal; step 139, turning off the power switch when the current sense signal reaches the peak current signal and turning on the power switch when the ZCD signal reaches the ZCD reference signal.

In one embodiment, the control method 130 further comprises: rectifying an AC voltage via a bridge rectifier to get a rectified voltage; detecting the output current of the switching mode power supply; generating a compensation signal based on a current reference signal and the output current of the switching mode power supply; and multiplying the rectified voltage with the compensation signal to generate the peak current signal.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. A switching mode power supply, comprising:
a power switch;
an energy storage component coupled to the power switch, the energy storage component storing energy when the power switch is on and transferring energy when the power switch is off;
a current sense resistor coupled between the power switch and a ground reference to generate a current sense signal based on a current flowing through the power switch;
a mode select resistor having a first terminal and a second terminal, the first terminal coupled to a connection node of the current sense resistor and the power switch;
a ZCD (zero cross detecting) circuit configured to generate a ZCD signal based on a voltage across the power switch;
a first diode having an anode terminal and a cathode terminal, the anode terminal coupled to the ZCD circuit to receive the ZCD signal; and
a control circuit configured to provide a switch control signal to control the on and off of the power switch, the control circuit having a multi-function pin coupled to the second terminal of the mode select resistor and the cathode terminal of the first diode;
wherein: in a startup period of the switching mode power supply, the control circuit compares a signal received by the multi-function pin with a mode control reference signal, and determines a work mode of the switching mode power supply based on a comparison result; in a normal operation period of the switching mode power supply, the control circuit compares the signal received by the multi-function pin with a peak current signal when the power switch is on, and compares the signal received by the multi-function pin with a ZCD reference signal when the power switch is off, and controlling the on and off of the power switch based on comparison results.

2. The switching mode power supply of claim 1, wherein the control circuit comprises:
a startup detect circuit configured to generate a startup detect signal indicative of whether the control circuit is in the startup period or is in the normal operation period based on the status of the control circuit;
a mode control circuit having a first input terminal coupled to the multi-function pin of the control circuit to receive a mode select signal, a second input terminal coupled to the startup detect circuit to receive the startup detect signal, a third input terminal configured to receive the mode control reference signal, and an output terminal configured to generate a mode control signal based on the mode select signal, the startup detect signal and the mode control reference signal;

a peak current signal circuit having a first input terminal configured to receive a rectified voltage, a second input terminal coupled to the mode control circuit to receive the mode control signal, a third input terminal configured to receive a feedback reference signal, a fourth input terminal coupled to the multi-function pin to receive the current sense signal, a fifth input terminal configured to receive the switch control signal, and an output terminal configured to provide the peak current signal based on the rectified voltage, the mode control signal, the feedback reference signal, the current sense signal and the switch control signal;

a voltage control circuit having a control terminal configured to receive the switch control signal, a first input terminal coupled to the multi-function pin to receive the ZCD signal, a second input terminal configured to receive the ZCD reference signal, and an output terminal configured to provide a voltage control signal based on the switch control signal, the ZCD signal and the ZCD reference signal;

a current control circuit having a control terminal configured to receive the switch control signal, a first input terminal coupled to the multi-function pin to receive the current sense signal, a second input terminal coupled to the peak current signal circuit to receive the peak current signal, and an output terminal configured to provide a current control signal based on the switch control signal, the current sense signal and the peak current signal; and a logic circuit having a first input terminal coupled to the voltage control circuit to receive the voltage control signal, a second input terminal coupled to the current control circuit to receive the current control signal, and an output terminal configured to provide the switch control signal based on the voltage control signal and the current control signal.

3. The switching mode power supply of claim 2, wherein the peak current signal circuit comprises:

a current average circuit having a first input terminal coupled to the multi-function pin to receive the current sense signal, a second input terminal configured to receive the switch control signal, and an output terminal configured to provide a current average signal based on the current sense signal and the switch control signal;

an error amplifier having a first input terminal coupled to the current average circuit to receive the current average signal, a second input terminal configured to receive the feedback reference signal, and an output terminal configured to provide an error amplify signal based on the current average signal and the feedback reference signal;

an input voltage process circuit having a first input terminal configured to receive the rectified voltage, a second input terminal coupled to the mode control circuit to receive the mode control signal, and an output terminal configured to provide a PFC (Power Factor Correction) reference signal based on the rectified voltage and the mode control signal; and a first multiply circuit having a first input terminal coupled to the input voltage process circuit to receive the PFC reference signal, a second input terminal coupled to the error amplifier to receive the error amplify signal, and an output terminal configured to provide the peak current signal based on the PFC reference signal and the error amplify signal.

4. The switching mode power supply of claim 3, wherein the input voltage process circuit comprises:

a peak detect circuit having an input terminal configured to receive the rectified voltage, and an output terminal configured to provide a peak detect signal indicative of a peak value of the rectified voltage based on the rectified voltage;

a second multiply circuit having an input terminal coupled to the peak detect circuit to receive the peak detect signal, and an output terminal configured to generate a clamp reference signal based on the peak detect signal, wherein the clamp reference signal is a product of the peak detect signal and a coefficient smaller than 1;

a clamp circuit having a first input terminal coupled to the second multiply circuit to receive the clamp reference signal, a second input terminal configured to receive the rectified voltage, and an output terminal configured to provide a clamped signal based on the clamp reference signal and the rectified voltage; and a first select circuit having a control terminal configured to receive the mode control signal, a first input terminal coupled to the clamp circuit to receive the clamped signal, a second input terminal configured to receive the rectified voltage, and an output terminal configured to provide the clamped signal or the rectified voltage as the PFC reference signal based on the mode control signal.

5. The switching mode power supply of claim 2, wherein the peak current signal circuit comprises:

an error amplifier having a first input terminal configured to receive a feedback signal indicative of the output voltage of the switching mode power supply, a second input terminal configured to receive a feedback reference signal, and an output terminal configured to provide an error amplify signal based on the feedback signal and the feedback reference signal;

an input voltage process circuit having a first input terminal configured to receive the rectified voltage, a second input terminal coupled to the mode control circuit to receive the mode control signal, and an output terminal configured to provide a PFC reference signal based on the rectified voltage and the mode control signal; and a first multiply circuit having a first input terminal coupled to the input voltage process circuit to receive the PFC reference signal, a second input terminal coupled to the error amplifier to receive the error amplify signal, and an output terminal configured to provide the peak current signal based on the PFC reference signal and the error amplifier signal.

6. The switching mode power supply of claim 5, wherein the input voltage process circuit comprises:

a peak detect circuit having input terminal configured to receive the rectified voltage, and an output terminal configured to provide a peak detect signal indicative of the peak value of the rectified voltage based on the rectified voltage;

a second multiply circuit having an input terminal coupled to the peak detect circuit to receive the peak detect signal, and an output terminal configured to generate a clamp reference signal based on the peak detect signal, wherein the clamp reference signal is a product of the peak detect signal and a coefficient smaller than 1;

a clamp circuit having a first input terminal coupled to the second multiply circuit to receive the clamp reference signal, a second input terminal configured to receive the rectified voltage, and an output terminal configured to provide a clamped signal based on the clamp reference signal and the rectified voltage; and a first select circuit having a control terminal configured to receive the mode control signal, a first input terminal coupled to the clamp circuit to receive the clamped signal, a second input terminal configured to receive the rectified voltage, and an output terminal configured to provide the clamped signal or the rectified voltage as the PFC reference signal based on the mode control signal.

7. The switching mode power supply of claim 2, wherein the mode control circuit comprises:
a mode select comparator having a first input terminal coupled to the multi-function pin to receive the mode select signal, a second input terminal configured to receive the mode control reference signal, and an output terminal configured to provide the mode control signal based on the mode select signal and the mode control reference signal; and
a charge circuit having a first input terminal coupled to the startup detect circuit to receive the startup detect signal, a second input terminal coupled to the mode select comparator to receive the mode control signal, and an output terminal coupled to the multi-function pin to provide a current based on the startup detect signal and the mode control signal.

8. The switching mode power supply of claim 1, wherein the control circuit comprises:
a startup detect circuit configured to provide the startup detect signal indicative of whether the control circuit is in the startup period or is in the normal operation period based on the status of the control circuit;
a mode control circuit having a first input terminal coupled to the multi-function pin to receive a mode select signal, a second input terminal coupled to the startup detect circuit to receive the startup detect signal, a third input terminal configured to receive a mode control reference signal, and an output terminal configured to provide a mode control signal based on the mode select signal, the startup detect signal and the mode control reference signal;
a peak current signal circuit having a first input terminal configured to receive a feedback reference signal, a second input terminal coupled to the multi-function pin to receive the current sense signal, a third input terminal configured to receive the switch control signal, and an output terminal configured to provide the peak current signal based on the feedback reference signal, the current sense signal and the switch control signal;
a voltage control circuit having a control terminal configured to receive the switch control signal, a first input terminal coupled to the multi-function pin to receive the ZCD signal, a second input terminal configured to receive the ZCD reference signal, and an output terminal configured to provide a voltage control signal based on the switch control signal, the ZCD signal and the ZCD reference signal;
a current control circuit having a control terminal configured to receive the switch control signal, a first input terminal coupled to the multi-function pin to receive the current sense signal, a second input terminal coupled to the peak current signal circuit to receive the peak current signal, and an output terminal configured to provide a current control signal based on the switch control signal, the current sense signal and the peak current signal; and
a logic circuit having a first input terminal coupled to the voltage control circuit to receive the voltage control signal, a second input terminal coupled to the current control circuit to receive the current control signal, a third terminal coupled to the mode control circuit to receive the mode control signal, and an output terminal configured to provide the switch control signal based on the voltage control signal, the current control signal and the mode control signal.

9. The switching mode power supply of claim 8, wherein the peak current signal circuit comprises:
a current average circuit having a first input terminal coupled to the multi-function pin to receive the current sense signal, a second input terminal configured to receive the switch control signal, and an output terminal configured to provide a current average signal based on the current sense signal and the switch control signal; and
an error amplifier having a first input terminal coupled to the current average circuit to receive the current average signal, a second input terminal configured to receive the feedback reference signal, and an output terminal configured to provide the peak current signal based on the current average signal and the feedback reference signal.

10. The switching mode power supply of claim 8, wherein the logic circuit comprises:
a delay circuit having an input terminal coupled to the voltage control circuit to receive the voltage control signal and an output terminal configured to provide a delayed voltage control signal based on the voltage control signal;
a second select circuit having a control terminal coupled to the mode control circuit to receive the mode control signal, a first input terminal coupled to the voltage control circuit to receive the voltage control signal, a second input terminal coupled to the delay circuit to receive the delayed voltage control signal, and an output terminal configured to provide the voltage control signal or the delayed voltage control signal based on the mode control signal; and
a first RS flip-flop having a set terminal coupled to the output terminal of the second select circuit, a reset terminal coupled to the current control circuit to receive the current control signal, and an output terminal configured to provide the switch control signal based on the signal provided by the second select circuit and the current control signal.

11. The switching mode power supply of claim 8, wherein the mode control circuit comprises:
a mode select comparator having a first input terminal coupled to the multi-function pin to receive the mode select signal, a second input terminal configured to receive the mode control reference signal, and an output terminal configured to provide the mode control signal based on the mode select signal and the mode control reference signal; and
a charge circuit having a first input terminal coupled to the startup detect circuit to receive the startup detect signal, a second input terminal coupled to the mode select comparator to receive the mode control signal, and an output terminal coupled to the multi-function pin to provide a current based on the startup detect signal and the mode control signal.

12. The switching mode power supply of claim 1, wherein the control circuit comprises:
a startup detect circuit configured to provide the startup detect signal indicative of whether the control circuit is in the startup period or is in the normal operation period based on the status of the control circuit;
a mode control circuit having a first input terminal coupled to the multi-function pin, a second input terminal coupled to the startup detect circuit to receive the startup detect signal, a third input terminal configured to receive the mode control reference signal, and an output terminal configured to provide a mode control signal based on a mode select signal, the startup detect signal and the mode control reference signal;

a peak current signal circuit having a first input terminal configured to receive a feedback signal indicative of the output voltage of the switching mode power supply, a second input terminal configured to receive a feedback reference signal, and an output terminal configured to provide the peak current signal based on the feedback signal and the feedback reference signal;

a voltage control, circuit having a control terminal configured to receive the switch control signal, a first input terminal coupled to the multi-function pin to receive the ZCD signal, a second input terminal configured to receive the ZCD reference signal, and an output terminal configured to provide a voltage control signal based on the switch control signal, the ZCD signal and the ZCD reference signal;

a current control circuit having a control terminal configured to receive the switch control signal, a first input terminal coupled to the multi-function pin to receive the current sense signal, a second input terminal coupled to the peak current signal circuit to receive the peak current signal, and an output terminal configured to provide a current control signal based on the switch control signal, current sense signal and the peak current signal; and a logic circuit having a first input terminal coupled to the voltage control circuit to receive the voltage control signal, a second input terminal coupled to the current control circuit to receive the current control signal, a third input terminal coupled to the mode control circuit to receive the mode control signal, and an output terminal configured to provide the switch control signal based on the voltage control signal, the current control signal and the mode control signal.

13. The switching mode power supply of claim 12, wherein the logic circuit comprises:

a delay circuit having an input terminal coupled to the voltage control circuit to receive the voltage control signal and an output terminal configured to provide a delayed voltage control signal based on the voltage control signal;

a second select circuit having a control terminal coupled to the mode control circuit to receive the mode control signal, a first input terminal coupled to the voltage control circuit to receive the voltage control signal, a second input terminal coupled to the delay circuit to receive the delayed voltage control signal, and an output terminal configured to provide the voltage control signal or the delayed voltage control signal based on the mode control signal; and a first RS flip-flop having a set terminal coupled to the output terminal of the second select circuit, a reset terminal coupled to the current control circuit to receive the current control signal, and an output terminal configured to provide the switch control signal based on the signal provided by the second select circuit and the current control signal.

14. The switching mode power supply of claim 12, wherein the mode control circuit comprises:

a mode select comparator having a first input terminal coupled to the multi-function pin to receive the mode select signal, a second input terminal configured to receive the mode control reference signal, and an output terminal configured to provide the mode control signal based on the mode select signal and the mode control reference signal; and a charge circuit having a first input terminal coupled to the startup detect circuit to receive the startup detect signal, a second input terminal coupled to the mode select comparator to receive the mode control signal, and an output terminal coupled to the multi-function pin to provide a current based on the startup detect signal and the mode control signal.

15. A control method for a switching mode power supply, wherein the switching mode power supply comprises a power switch, an energy storage component and a control circuit, the control method comprising:

generating a mode select signal in a startup period of the switching mode power supply;

generating a current sense signal based on a current flowing through the power switch;

generating a ZCD (Zero Cross Detecting) signal based on a voltage across the power switch;

receiving the mode select signal, the current sense signal and the ZCD signal via a multi-function pin;

selecting a work mode of the switching mode power supply based on the mode select signal in the startup period of the switching mode power supply;

if the power switch is on, comparing a signal received by the multi-function pin with a peak current signal, otherwise, comparing the signal received by the multi-function pin with a ZCD reference signal; and turning off the power switch when the current sense signal reaches the peak current signal and turning on the power switch when the ZCD signal reaches the ZCD reference signal.

16. The control method of claim 15, further comprising:

rectifying an AC voltage via a bridge rectifier to get a rectified voltage;

detecting an output current of the switching mode power supply;

generating a compensation signal based on a current reference signal and the output current of the switching mode power supply; and multiplying the rectified voltage with the compensation signal to generate the peak current signal.

17. A switching mode power supply, comprising:

a power switch;

an energy storage component coupled to the power switch, the energy storage component storing energy when the power switch is on and transferring energy when the power switch is off;

a mode select circuit configured to provide a mode select signal;

a ZCD (Zero Cross Detecting) circuit configured to generate a ZCD signal based on a voltage across the power switch;

a first diode having an anode terminal and a cathode terminal, the anode terminal coupled to the ZCD circuit to receive the ZCD signal; and a control circuit configured to provide a switch control signal to control the on and off of the power switch, the control circuit having a multi-function pin coupled the cathode terminal of the first diode and coupled to the mode select circuit to receive the mode select signal;

wherein: in a startup period of the switching mode power supply, the control circuit compares the mode select signal with a mode control reference signal and determines a work mode of the switching mode power supply based on a comparison result; in a normal operation period of the switching mode power supply, the control circuit compares a signal received by the multi-function pin with a ZCD reference signal, and turns on the power switch based on the comparison result.

18. The switching mode power supply of claim 17, wherein the mode select circuit comprises a resistor having a first terminal coupled to a connection node of the current sense resistor and the power switch and a second terminal coupled to the multi-function pin of the control circuit.

19. The switching mode power supply of claim 17, wherein the mode select circuit comprises a voltage source configured to provide a voltage signal as the mode select signal.

20. A switching mode power supply, comprising:
   a power switch;
   an energy storage component coupled to the power switch, the energy storage component storing energy when the power switch is on and transferring energy when the power switch is off;
   a current sense resistor coupled between the power switch and a ground reference to generate a current sense signal based on a current flowing through the power switch;
   a mode select resistor having a first terminal and a second terminal, the first terminal coupled to a connection node of the current sense resistor and the power switch; and
   a control circuit configured to provide a switch control signal to control the on and off of the power switch, the control circuit having a multi-function pin coupled to the second terminal of the mode select resistor;
   wherein: in a startup period of the switching mode power supply, the control circuit compares a signal received by the multi-function pin with a mode control reference signal and determines a work mode of the switching mode power supply based on a comparison result; in a normal operation period of the switching mode power supply, the control circuit compares the signal received by the multi-function pin with a peak current signal and turns off the power switch based on a comparison result.

* * * * *